United States Patent
Eggink et al.

(10) Patent No.: US 7,998,392 B2
(45) Date of Patent: Aug. 16, 2011

(54) METHOD FOR MANUFACTURING AND ATTACHMENT OF WING FAIRINGS

(75) Inventors: Roy Anthony Eggink, Mukilteo, WA (US); David Scott Eberhardt, Seattle, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 11/861,024

(22) Filed: Sep. 25, 2007

(65) Prior Publication Data

US 2009/0078825 A1    Mar. 26, 2009

(51) Int. Cl.
*B29C 70/00*    (2006.01)
(52) U.S. Cl. ............... 264/257; 264/261; 244/171.7
(58) Field of Classification Search ............. 264/261, 264/257; 244/158.9, 159.1, 159.2, 171.7, 244/200, 200.1
See application file for complete search history.

(56) References Cited

U.S. PATENT DOCUMENTS

| 2,997,262 | A | * | 8/1961 | Kirk et al. ............... 244/123.12 |
| 3,177,273 | A | * | 4/1965 | Fingerhut et al. ............. 264/511 |
| 3,352,741 | A | * | 11/1967 | Miller ........................ 428/160 |
| 4,508,774 | A | * | 4/1985 | Grabhoefer et al. .......... 428/220 |
| 5,080,306 | A | | 1/1992 | Porter et al. |
| 5,489,074 | A | * | 2/1996 | Arnold et al. ............. 244/159.1 |
| 6,173,807 | B1 | | 1/2001 | Welch et al. |
| 2006/0060705 | A1 | | 3/2006 | Stulc et al. |
| 2006/0083902 | A1 | | 4/2006 | Jarosz et al. |

FOREIGN PATENT DOCUMENTS

EP    1834873 A    9/2007

* cited by examiner

*Primary Examiner* — Joseph S Del Sole
*Assistant Examiner* — James Sanders
(74) *Attorney, Agent, or Firm* — Yee & Associates, P.C.

(57) ABSTRACT

A method and apparatus for manufacturing and installing a fairing on an aircraft. In one advantageous embodiment, a composite fairing is installed on the aircraft. A composite sheet having a form of the composite fairing is formed. A plurality of cured composite tiles is created from the composite sheet, wherein spaces are present between the plurality of composite tiles. The plurality of composite tiles is cured to form the composite fairing. The composite fairing is attached to a surface of the aircraft. The spaces between the plurality of composite tiles are filled with a flexible filler.

12 Claims, 4 Drawing Sheets

METHOD FOR MANUFACTURING AND ATTACHMENT OF WING FAIRINGS

BACKGROUND INFORMATION

1. Field

The present disclosure relates generally to aircraft products and in particular to a method and apparatus for manufacturing aircraft products. Still more particularly, the present disclosure relates to a method for manufacturing and attaching wing fairings.

2. Background

Aerodynamics involves the shaping of objects that affect the flow of air, liquid, or gas. Aerodynamics is important in a number of areas, including, for example, aerospace engineering and automotive engineering. With respect to aircraft, the aerodynamics of various surfaces, such as, for example, wings, landing gear, engines, and a fuselage are important for reducing drag and increasing engine efficiency.

An example of one aerodynamic structure used to produce a smooth outline and reduce drag on an aircraft is a fairing. A fairing may be, for example, a lightweight shape and cover for gaps and spaces for different parts of an aircraft. Alternatively, a fairing may be used to re-contour a surface for better performance. Fairings also may be used in other vehicles, such as, for example, an automobile, a spacecraft, or a submarine.

With respect to aircraft, design changes may improve the performance of an aircraft. For example, a wing design for an aircraft may change over time as further development and testing occurs. A change in the surface of a wing may increase high gas speed cruise performance, such as lower fuel burn. Another performance increase may be, for example, an increase in the top speed of the aircraft. These types of changes may be propagated to current production of the aircraft.

Older aircraft of the same type or model, already in service, may be modified or retrofitted to implement these design changes. A drastic change to modify retrofit is to replace the wing for an aircraft. A less drastic change involves modifying the current shape of the wing. For example, a wing fairing may be attached to an upper surface of an aircraft wing to improve the performance of the aircraft. Older aircraft, however, may require complex and expensive retrofits, even with this less drastic modification. In some cases, the complexity and the costs of making the modifications to add a fairing may be prohibitive. As a result, older versions of the same aircraft may have a lower fuel efficiency as compared to newer production of the same model.

SUMMARY

An embodiment of the present disclosure provides a method and apparatus for manufacturing and installing a fairing on an aircraft. In one advantageous embodiment, a composite fairing is installed on an aircraft. A composite sheet having a form of the composite fairing is formed. A plurality of cured composite tiles is created from the composite sheet, wherein spaces are present between the plurality of composite tiles. The composite fairing is attached to a surface of the aircraft. The spaces between the plurality of composite tiles are filled with a flexible filler.

In another advantageous embodiment, a fairing is manufactured. A composite sheet is formed in a shape of the fairing. A plurality of composite tiles is formed in the composite sheet to form an assembly for the fairing. The plurality of composite tiles is cured to form the fairing.

In yet another advantageous embodiment, an apparatus comprises a composite layer, a plurality of composite tiles, and a flexible filler. The composite layer has an outline for a fairing. The plurality of composite tiles is joined to the composite layer in a shape of the fairing, wherein spaces are present between the plurality of composite tiles. The flexible filler is located in the spaces between the plurality of composite tiles.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
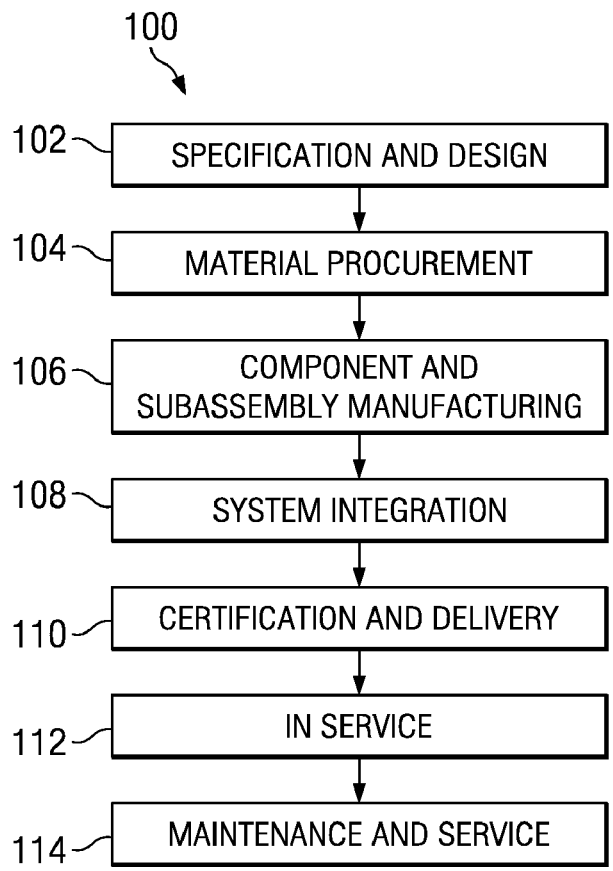
FIG. 1 is a diagram illustrating an aircraft manufacturing and service method in accordance with an advantageous embodiment.
Figure 2:
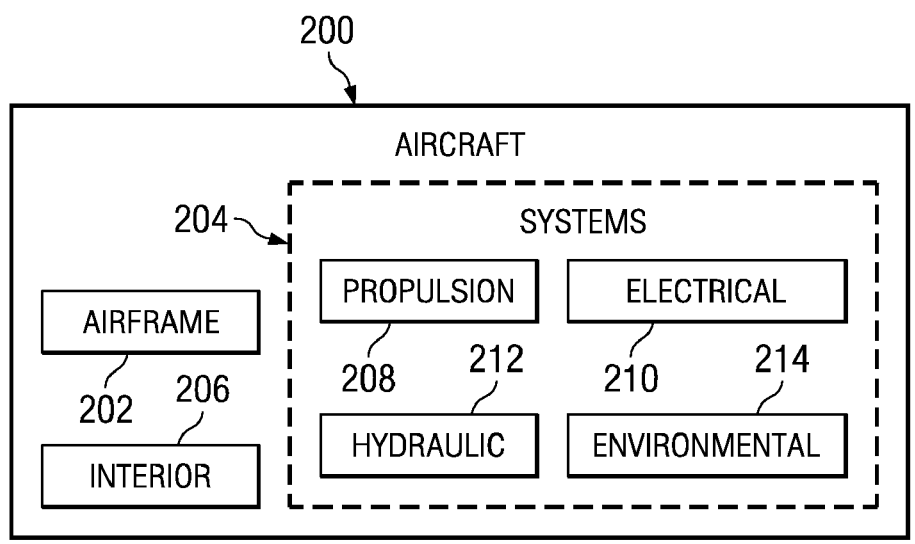
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2.

Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. For example, the method and apparatus for creating and attaching a fairing to a surface of an aircraft may be implemented as part of the assembly of a wing of an aircraft. Similarly, one or more of apparatus embodiments, method embodiments, or a combination thereof may be utilized while aircraft 200 is in maintenance and service 114 in FIG. 1. For example, the method and apparatus for the composite fairing may be used to retrofit or modify an existing aircraft. In particular, the fairing may be used to change the contour of the surface, such as a wing of the aircraft during maintenance and service 114 in FIG. 1.

Fairings may be found on various portions of an aircraft. For example, fairings may be found at wing tips, wing roots, tail cones, fins and rudder tips, strut to wing and strut to fuselage functions, fixed landing gear junctions, and engine cowlings. Fairings also may be found on a spacecraft, such as on satellite launch vehicles with designs that help protect the satellite from aerodynamic forces.

The different advantageous embodiments recognize that currently used fairings are fastened to the surface of an aircraft with fasteners. The different advantageous embodiments also recognize that the use of these fasteners may require the drilling of holes into areas, such as fuel tanks and other sensitive equipment. With this type of modification, using currently available methods, the different advantageous embodiments recognize that additional labor and effort is needed to ensure that any use of fasteners to attach a fairing does not result in any safety issues.

Thus, the different advantageous embodiments provide a method and apparatus to manufacture and install a fairing on an aircraft that does not require the use of fasteners. In these different examples, a composite fairing is created in which the composite fairing may be attached or bonded to a surface of the aircraft. This type of fairing may be used on both metal and composite surfaces. Further, the different advantageous embodiments provide a design for the composite fairing that allows for easier transportation and installation of the composite fairing. In different embodiments, the composite fairing has a flexible base or layer that allows the composite fairing to be rolled up, folded, or bent for shipping.

Figure 3:
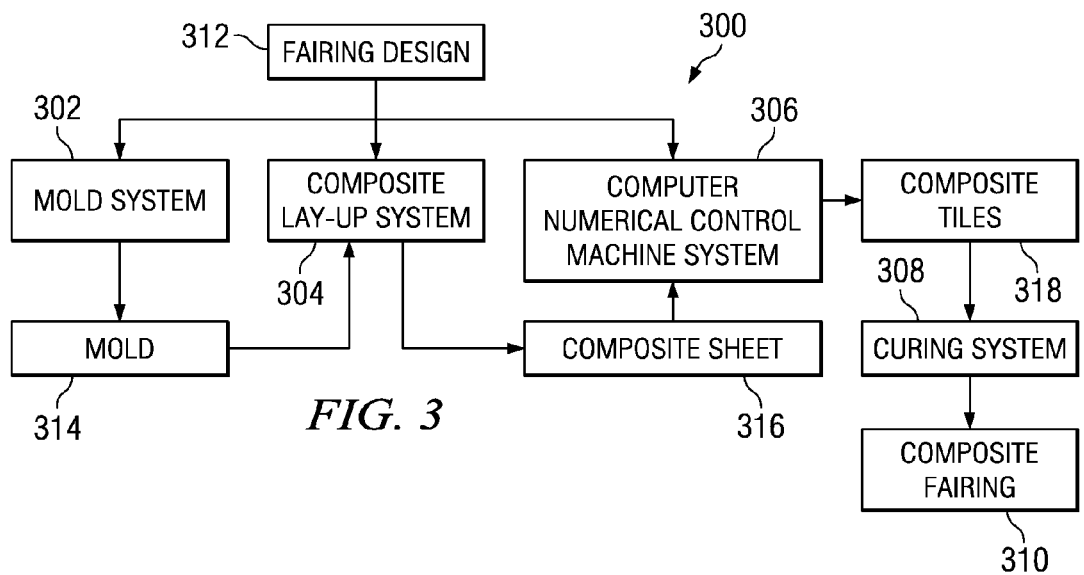
FIG. 3 is a block diagram illustrating components used to manufacture a fairing in accordance with advantageous embodiment.

With reference now to FIG. 3, a block diagram illustrating components used to manufacture a fairing is depicted in accordance with advantageous embodiment. In this example, fairing manufacturing system 300 includes mold system 302, composite lay-up system 304, computer numerical control machine system 306 and curing system 308. These different functional blocks illustrate systems that may be used to create composite fairing 310 from fairing design 312. The different illustrated systems may be implemented through automated or computerized machines, human labor, or a combination of the two.

In these examples, fairing design 312 may be, for example, a three dimensional design generated by a software application. The software application, in these examples, may be a computer-aided design software application. Fairing design 312 is used by mold system 302 to create mold 314. A mold can be machined from a numerical controlled machine, such as, a Haas VF 7, which is available from Haas Automation. Any firm material, such as hard foam, may be used for mold 314. Mold 314 is a mold that may be used to form the shape of the fairing.

In these examples, composite lay-up system 304 may lay-up composite materials using mold 314 to generate composite sheet 316. In this example, composite sheet 316 has the shape of the composite fairing in fairing design 312. In these examples, the lay-up of the materials may include various composite materials, such as, for example, composite tape and composite fabric. These composite materials may be prepreg composite materials. A prepreg material is material in which resin and a curing agent are impregnated into the reinforcing fiber. The reinforcing fiber may be, for example, a fabric, a roving, and unidirectional tape. These fabrics may have meshes or may be nettings.

Composite lay-up system 304 may be implemented using one or more machines. An example of a machine that may be used is an M. Torres lay-up machine, which is a tape lay-up machine available from M. Torres. Another example is Access-Atlas, which is a composite working machine available from Forrest-line.

Computer numerical control machine system 306 is used, in these examples, to cut composite sheet 316 into composite tiles 318. One such machine is a Haas VF 7, and the contour area can be machined with ball nose end-mills. Computer numerical control machine system 306 may include one or more machines that provide precise cutting of composite sheet 316, using either carbide or high-speed steel cutters, in these examples. A computer numerical control machine may automatically perform operations based on a program or set of instructions input into the machine.

In this particular example, computer numerical control machine system 306 is programmed to form composite tiles 318 from composite sheet 316 with a gridline pattern. In these examples, the tiles are 3×3 tiles with one quarter inch spaces between them. Of course, the tiles may take other sizes and spaces, depending on the particular implementation. Further, in other implementations, the tiles may be other shapes other than squares. Any shape that may interlock with other shapes may be used. These composite tiles form composite fairing 310.

Depending on the particular implementation, composite tiles 318 may be laid onto a composite layer, such as a composite netting, fabric or other material, for placement onto the aircraft. In yet other advantageous embodiments, composite sheet 316 includes the composite netting as one of the layers when processed by computer numerical control machine system 306.

Composite tiles 318 are cured using curing system 308. Curing system 308, in these examples, may be a composite curing oven in which heat and pressure may be applied to composite tiles 318. In these examples, curing system 308 may be an oven, which provides temperatures of around 350 degrees. Of course, any type of oven capable of curing composite parts may be used in the different advantageous embodiments. In addition to using a curing oven, other types of curing processes may be employed. For example, an electron beam system may be used to cure composite tiles 318 instead of using a thermal curing system. In other embodiments, composite sheet 316 may be cured prior to being placed on the composite layer.

Once cured, composite tiles 318 form composite fairing 310. A filler may be placed into the different channels or grooves between the tiles within composite fairing 310. This filler may be placed into the grooves during installation. In other embodiments, the filler may be placed into these grooves prior to transporting composite fairing 310 to the aircraft for installation.

In these examples, a composite layer on which composite tiles 318 are placed is a flexible material. In these examples, the material in the base is a composite netting or fabric. This flexibility allows composite fairing 310 to be rolled up and shipped to the installation site. At the installation site, composite fairing 310 may be unrolled into position by aligning two points between the wing and fabric. This type of configuration of composite fairing 310 makes it easier to ship this component to the installation site.

Figure 4:
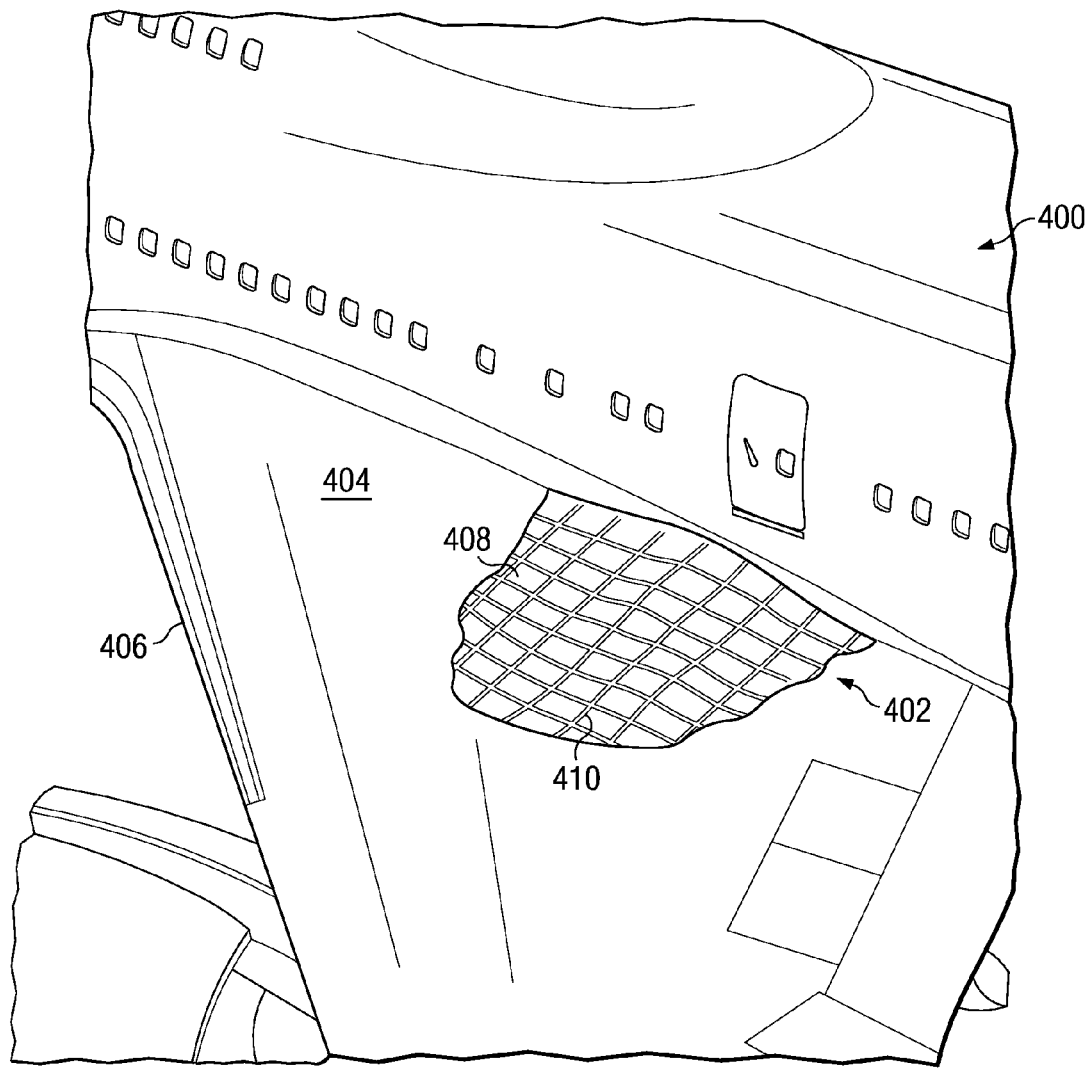
FIG. 4 is a diagram illustrating a fairing on an aircraft in accordance with an advantageous embodiment.

Turning now to FIG. 4, a diagram illustrating a fairing on an aircraft is depicted in accordance with an advantageous embodiment. In this example, aircraft 400 is an example of an aircraft, such as aircraft 200 in FIG. 2. In this particular example, composite fairing 402 is a composite fairing created using the different advantageous embodiments. In this example, composite fairing 402 is located on top surface 404 of wing 406 in aircraft 400. In this example, composite fairing 402 contains composite tiles 408 on a composite base (not shown) and filler 410. Filler 410 is a flexible filler material to provide a smooth surface to tile from composite fairing 402. An example of filler material is 5010 ty 60 RTV 102 made by General Electric Company.

This installation of composite fairing 402 on aircraft 400, in these examples, involves preparing top surface 404 of wing 406 in aircraft 400 for attachment of composite fairing 402. This preparation may include cleaning top surface 404. The location for composite fairing 402 is then marked on top surface 404. The location is marked at two points, in these examples. Composite fairing 402 is unrolled between the two points that have been marked, in these examples.

Thereafter, an adhesive is applied. This adhesive may be applied to the bottom of composite fairing 402 and/or to top surface 404 of wing 406. The adhesive, in these examples, is cured at a room temperature or ambient temperature. In other words, the adhesive may be cured without requiring any additional heating, other than the heat present in the environment. Composite fairing 402 is then rolled out or placed onto top surface 404 of wing 406 at the marked location. Composite fairing 402 may then be sealed with filler 410, such as a flexible grout, to fill the different spaces between the tiles. Thereafter, the surface of composite fairing 402 and/or portions of top surface 404 may be painted.

Figure 5:
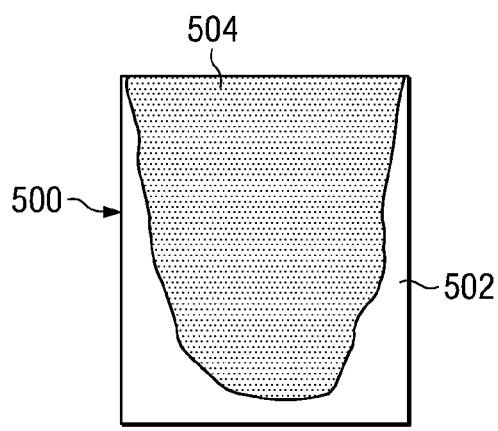
FIG. 5 is a diagram illustrating a mold of a fairing in accordance with an in accordance with an advantageous embodiment.

With reference now to FIG. 5, a diagram illustrating a mold of a fairing is depicted in accordance with an advantageous embodiment. In this example, mold 500 is an example of mold 314 in FIG. 3, which can be made from "Last a Foam 6700" available from General Plastics Inc.

In this particular example, mold 500 has form 502 that contains composite material 504. Composite material 504 is laid up within mold 500, in these examples. Composite material 504 may be laid up using a composite lay-up system, such as composite lay-up system 304 in FIG. 3. This lay-up system may place down different types of composite materials, such as composite tape or composite prepared fabric. Additionally, a foam core also may be included between an upper and lower composite material to form the composite tile. One type of material that can be used for the foam core is "Last a Foam 6700" available from General Plastics Inc. Of course, depending on the particular implementation, and depending on weight concerns, various types of layers and types of composite materials may be employed.

Figure 6:
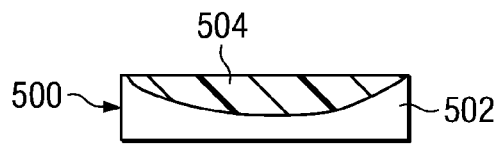
FIG. 6 is a cross-sectional view of a mold for a fairing in accordance with an advantageous embodiment.

Turning now to FIG. 6, a cross-sectional view of a mold for a fairing is depicted in accordance with an advantageous embodiment. In this example, a cross-sectional view of mold 500 with composite material 504 laid into form 502 is illustrated.

Figure 7:
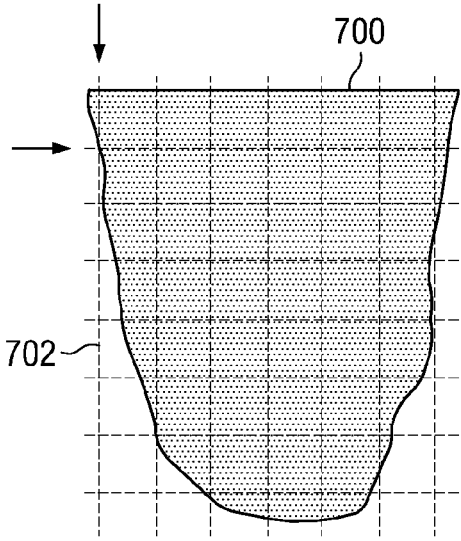
FIG. 7 is a diagram illustrating a composite sheet in accordance with an advantageous embodiment.

With reference now to FIG. 7, a diagram illustrating a composite sheet is depicted in accordance with an advantageous embodiment. In this example, composite sheet 700 is an example of a composite sheet that may be created from mold 500 in FIG. 5. In this example, grid 702 contains intersecting lines to be cut into composite sheet 700 to form tiles for the fairing.

The lines in grid 702 may be identified and cut into composite sheet 700 using a computer numerical control machine system, such as computer numerical control machine system 306 in FIG. 3. Of course, depending on the particular implementation, other types of machines may be used to cut composite sheet 700 into tiles. In some advantageous embodiments, the cuts may be made by hand.

Figure 8:
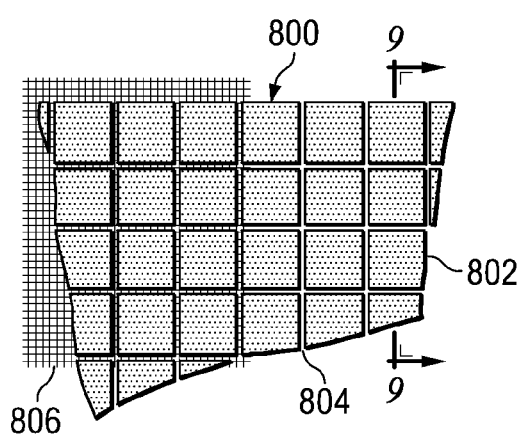
FIG. 8 is a diagram illustrating a portion of a composite fairing created from a composite sheet in accordance with an advantageous embodiment.

With reference now to FIG. 8, a diagram illustrating a portion of a composite fairing created from a composite sheet is depicted in accordance with an advantageous embodiment. In this example, composite fairing 800 is a composite fairing created from composite sheet 700 in FIG. 7.

In this example, tiles 802, generated from cutting composite sheet 700 in FIG. 7, have grout 804 placed into the areas in which the tile was cut. In this example, tiles 802 are located on top of composite netting 806. Composite netting 806 is a composite material, in these examples. In one embodiment, these components are integral to each other from the curing process. The cutting of the tiles forms channels that are deep enough to reach or nearly reach composite netting 806, but does not cut through composite netting 806 or all the way through composite sheet 700 in FIG. 7.

In other examples, composite sheet 700 in FIG. 7 may not include composite netting 806 after tiles 802 are cut from composite sheet 700 in FIG. 7. In this type of implementation, tiles 802 are placed onto composite netting 806. This placement may include using adhesive or glue to attach these components to each other.

Thereafter, the complete assembly is cured, in these examples. The curing may be performed using a curing system, such as curing system 308 in FIG. 3.

In these different advantageous embodiments, composite netting 806 is a base composite layer on which tiles 802 are placed. Composite netting 802 is flexible even after curing, in these examples. This flexibility allows for composite fairing 800 to be rolled up for transportation. The flexibility of this composite layer may make it easier to place and install composite fairing 800. This type of structure is in contrast to many currently used structures, in which the fairing is difficult to transport because of its shape and size.

Grout 804 is a flexible composite grout, in these examples, and also provides a sealant function. Without the flexible gap filler/sealer, the wing flexing under normal loads may put a high shear load on the bond between the surface of the wing and the fairing. By dividing the fairing into small tiles, and allowing them to flex with the wing, the shear forces on the bond are reduced. After grout 804 has been placed into the spaces left between tiles 802, the entire assembly may be cured again to cure grout 804. After curing, composite fairing 800 may be transported or placed onto a surface of an aircraft. In transporting composite fairing 800, composite fairing 800 may be rolled up for shipping or transport.

In these examples, tiles 802 are square tiles that are three inches on each side. Of course, tiles 802 may take other sizes or shapes, depending on the particular implementation. For example, two-inch or five-inch tiles may be used, depending on the particular design or implementation. Further, the tiles may have a rectangular shape rather than a square shape. In other embodiments, the shape may be a hexagonal shape. The thicknesses of individual tiles in tiles 802 may vary to provide the shape for the composite fairing.

Figure 9:
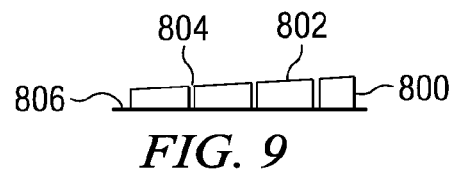
FIG. 9 is a cross-sectional view of a fairing in accordance with an advantageous embodiment.

With reference now to FIG. 9, a cross-sectional view of a fairing is depicted in accordance with an advantageous embodiment. In this example, composite fairing 800 is shown in a cross-sectional view taken along lines 9-9 in FIG. 8.

Figure 10:
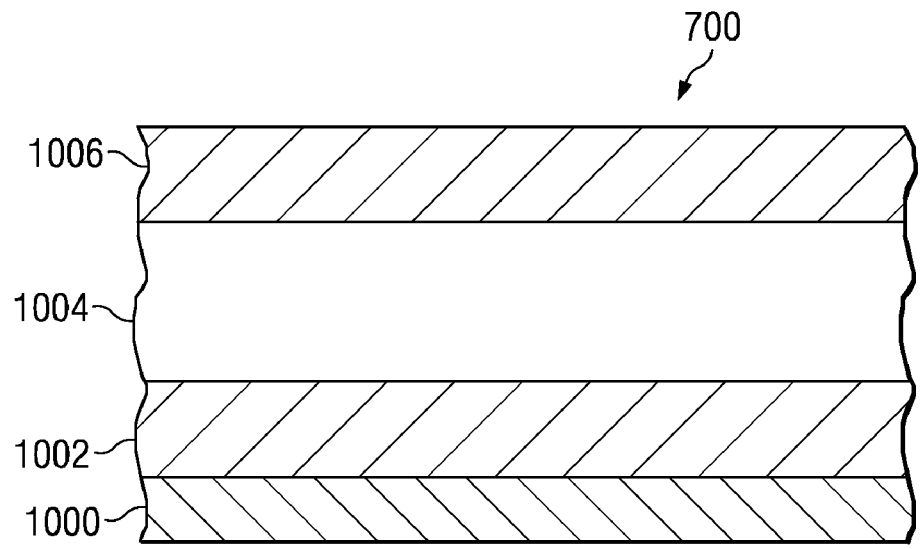
FIG. 10 is a diagram illustrating a cross-section of a composite sheet in accordance with an advantageous embodiment.

Turning now to FIG. 10, a diagram illustrating a cross-section of a composite sheet is depicted in accordance with an advantageous embodiment. In this example, a cross-section of composite sheet 700 in FIG. 7 is depicted. In this example, composite sheet 700 includes base layer 1000, composite layer 1002, core 1004 and composite layer 1006. Composite layer 1002, core 1004, and composite layer 1006 are the layers that form the tiles within the composite fairing. Base layer 1000 is the layer on which the composite tiles are attached or joined.

In this example, composite sheet 700 includes all of these layers. In other embodiments, base layer 1000 may not be present, and composite sheet 700 may be cut into tiles and placed onto a separate base layer with an adhesive. This cross-section is presented as an example of one manner in which composite sheet 700 may be configured.

Of course, other configurations of layers may be used, depending on the particular example. For example, additional composite layers and core layers may be included. In other examples, base layer 1000 may be omitted. The particular configuration of layers within composite sheet 700 may vary, depending on the particular design and implementation.

Figure 11:
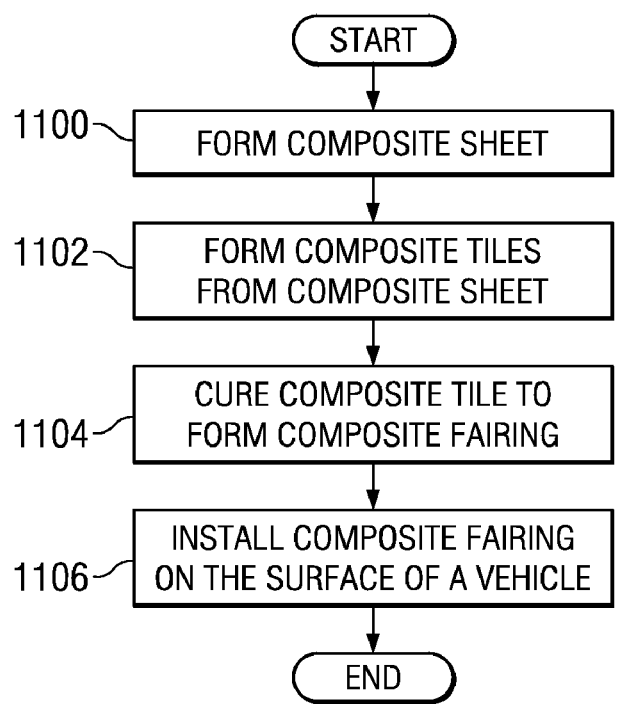
FIG. 11 is a flowchart of a process for creating and installing a composite fairing in accordance with an advantageous embodiment.

With reference now to FIG. 11, a flowchart of a process for creating and installing a composite fairing is depicted in accordance with an advantageous embodiment. The forming of the composite sheet may be performed using fairing manufacturing system 300 in FIG. 3, in these examples.

The process begins by forming a composite sheet (operation 1100). Thereafter, composite tiles are formed from the composite sheet (operation 1102). In operation 1102, the forming of the composite tiles creates spaces or channels between the tiles. In forming the composite tiles, a base layer remains through which the channels or spaces do not extend. The composite tiles are attached to this base layer, in the different examples. This base layer may be present during the forming of the composite tiles. In other implementations, the composite tiles may be cut apart and then attached to the base layer.

Thereafter, the composite tiles are cured to form the composite fairing (operation 1104). The composite fairing is then installed on the surface of a vehicle (operation 1106), with the process terminating thereafter. In installing the composite fairing on the surface of a vehicle in operation 1106, the spaces between the tiles are filled with a flexible filler, in the illustrative examples. The installation also may involve sealing the completed assembly. This sealing may be performed using paint or some other substance. In some cases, the flexible filler may be placed into the channels or spaces prior to installing or attaching the composite fairing to the surface of the vehicle.

Thus, the different advantageous embodiments provide a method and apparatus for manufacturing and installing a composite fairing on an aircraft. A composite sheet is formed in the shape of the composite fairing. Composite tiles are formed in the composite sheet. These composite tiles are cured to form the composite fairing.

In this manner, the different advantageous embodiments provide an ability to design and create fairings for different types of vehicles in a manner that does not require expensive retrofits that may occur with the use of metal fairings. Further, in the different advantageous embodiments, the tiles on the base layer of the fairing are flexible enough to allow for the fairing to be rolled up for easier transport. Also, this type of fairing reduces the amount of weight added to an aircraft when modifications are made to the surface of the aircraft.

As a further feature, in one or more of the different advantageous embodiments, the use of fasteners to attach a fairing to an aircraft are avoided. This type of feature is especially useful when a fairing is to be attached to an area in which drilling holes in the use of fairings is undesirable. For example, the cost of a fairing, in the different advantageous embodiments, is especially useful for adding fairings to areas where fuel tanks may be located underneath the surface of the aircraft. Without using fasteners in these areas, the resealing or inspection of fuel tanks is unnecessary.

Moreover, the composite fairing, in these examples, has a flexible composite base that makes it easier to transport the composite fairing to the site. In many cases, currently designed fairing cannot be easily transported to the installation site. Often times, these fairing may have to be transported in pieces, and must be reassembled at the installation site. The flexibility of the composite fairing, in the advantageous embodiments, allows for the composite fairing to be folded or rolled up for transportation.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installing a composite fairing on an aircraft, the method comprising:
    forming a composite sheet having a form of the composite fairing, wherein the composite sheet comprises a foam core, wherein the composite sheet further comprises a base composite layer, wherein the base composite layer is a flexible material selected from a group consisting of composite netting and a fabric, and wherein the fairing further comprises an aerodynamic smooth outline, shape configured to reduce air drag on the aircraft and further configured to improve the performance of the aircraft;
    creating a plurality of cured composite tiles from the composite sheet, wherein spaces are present between the plurality of composite tiles;
    attaching the composite fairing to a surface of the aircraft; and
    filling the spaces between the plurality of composite tiles with a flexible filler.

2. The method of claim 1, wherein the filling step comprises:
    filling the spaces between the plurality of composite tiles with the flexible filler after attaching the composite fairing on the surface of the aircraft.

3. The method of claim 2, wherein the attaching step comprises:
    placing the composite fairing on the surface of the aircraft with an adhesive between a bottom surface of the composite fairing and the surface of the aircraft.

4. The method of claim 1, wherein the composite sheet further comprises a first composite layer and a second composite layer on the core.

5. The method of claim 1 further comprising:
    performing the filling step prior to the attaching step.

6. A method for manufacturing a fairing, the method comprising:
    forming a composite sheet in a shape of the fairing, wherein the composite sheet comprises a foam core, wherein the composite sheet further comprises a base composite layer, wherein the base composite layer is a flexible material selected from a group consisting of composite netting and a fabric, and wherein the fairing further comprises an aerodynamic smooth outline, shape configured to reduce air drag on a vehicle and further configured to improve the performance of the vehicle;
    forming a plurality of composite tiles from the composite sheet to form an assembly for the fairing; and
    curing the plurality of composite tiles to form the fairing.

7. The method of claim 6 further comprising:
    installing the fairing on a surface of a vehicle.

8. The method of claim 7, wherein the vehicle is one of an aircraft, a submarine, a spacecraft, or an automobile.

9. The method of claim 6, wherein the forming step comprises:
    dividing the composite sheet to form a plurality of separated tiles; and
    attaching the plurality of separated tiles on a composite layer to form the plurality of composite tiles.

10. The method of claim 7, wherein the installing step comprises:
    attaching the fairing to the surface of the vehicle with an adhesive; and
    placing a flexible filler between spaces present between the plurality of composite tiles.

11. The method of claim 10, wherein the installing step further comprises:
    sealing the fairing after placing the flexible filler between the spaces.

12. The method of claim 6, wherein the composite sheet further comprises a first composite layer on the base composite layer and a second composite layer on the foam core.

* * * * *